UNITED STATES PATENT OFFICE.

MELVILLE G. PETERS AND JAMES AITKEN SHEPHERD, OF GLASGOW, SCOTLAND.

COMPOSITION FOR COATING FABRICS.

SPECIFICATION forming part of Letters Patent No. 718,151, dated January 13, 1903.

Application filed July 2, 1902. Serial No. 114,142. (No specimens.)

*To all whom it may concern:*

Be it known that we, MELVILLE GORDON PETERS and JAMES AITKEN SHEPHERD, subjects of the King of the United Kingdom of Great Britain and Ireland, residing at 92 West Regent street, Glasgow, Scotland, have invented a certain new and useful Composition for Coating Fabrics, (for which application for patent has been made in Great Britain, No. 267, dated January 4, 1902,) of which the following is a specification.

This invention has for its object to provide an improved composition for use in the manufacture of linoleum, floor-cloth, carriage-roofing, and the like as a coating for the fabric employed and which is adapted to render the goods more pliable or elastic and permits of their being more rapidly dried than is usual.

The improved composition is made up of whiting, dried linseed-oil, and any of the usual driers, such as litharge, to which ingredients a proportion of gum-tragasol is added, the latter replacing part of the oil usually employed and serving to impart flexibility and the more rapid drying of the composition, which is made into a pasty mass and applied as a coating to the fabric in the usual way. In making linoleum the whiting is replaced in whole or in part by cork-dust, the ingredient used acting as a filler for the composition. The gum-tragasol employed is a gum made from the kernels of beans of the locust or carob tree, the process for the production of which is set forth in the United States Letters Patent No. 566,497.

The proportions of the ingredients of the composition are approximately as follows, by weight: whiting or cork-dust, thirteen parts; tragasol gum, five parts; dried linseed-oil, five and one-half parts; driers, one-half part.

Having now described our invention, what we claim, and desire to secure by Letters Patent, is—

A composition for use in the manufacture of coated fabrics consisting of an intimate mixture with a suitable filler of tragasol gum, dried linseed-oil, and a drying compound in or about the proportions stated, substantially as and for the purpose set forth.

In witness whereof we have hereunto set our hands in presence of two witnesses.

MELVILLE G. PETERS.
JAMES AITKEN SHEPHERD.

Witnesses:
WALLACE FAIRWEATHER,
W. CRANSTON FAIRWEATHER.